May 26, 1942.   S. V. DILLON   2,283,974
COUPLING
Filed Dec. 6, 1940   6 Sheets-Sheet 1
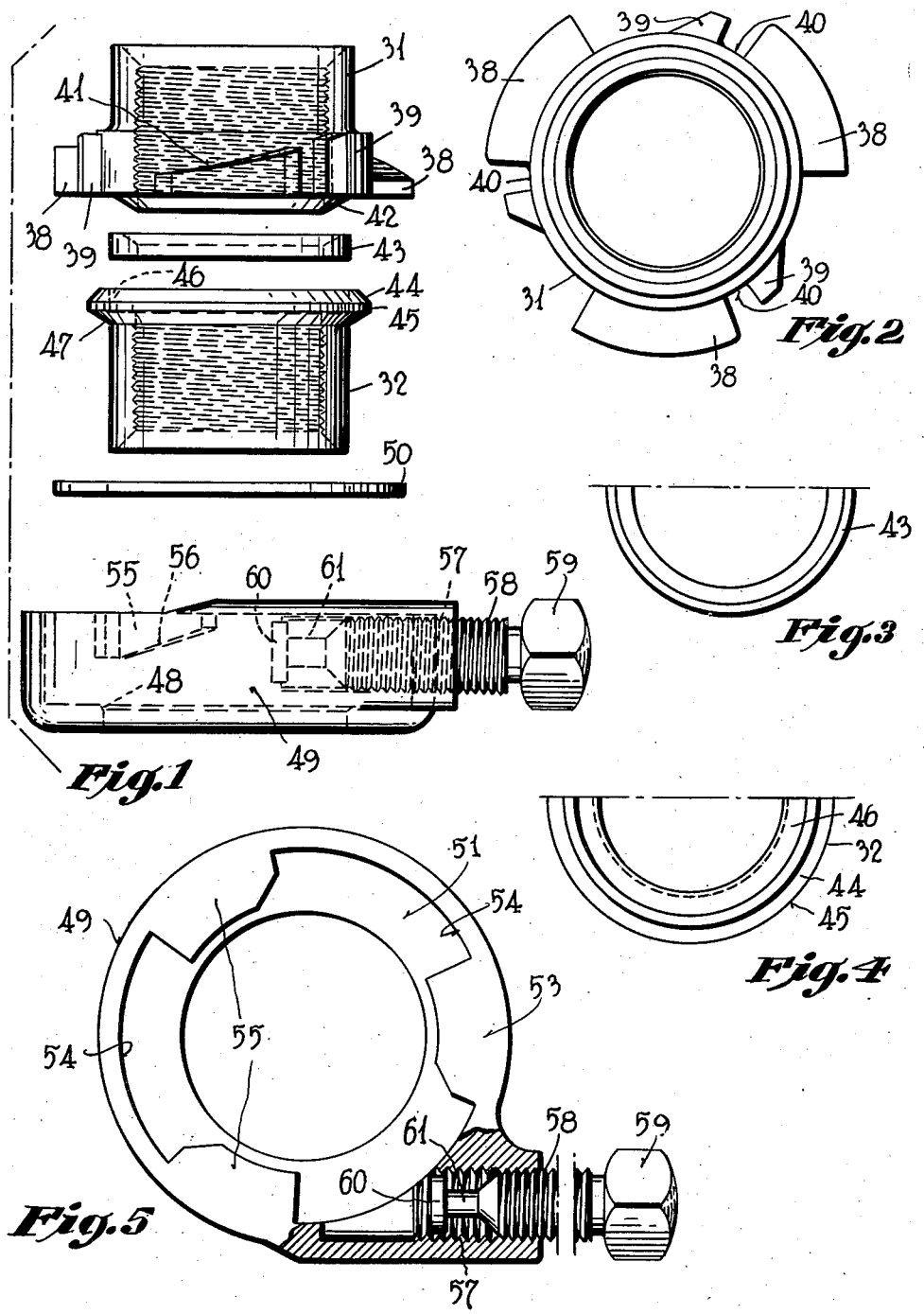

May 26, 1942.　　　　S. V. DILLON　　　　2,283,974
COUPLING
Filed Dec. 6, 1940　　　　6 Sheets-Sheet 2
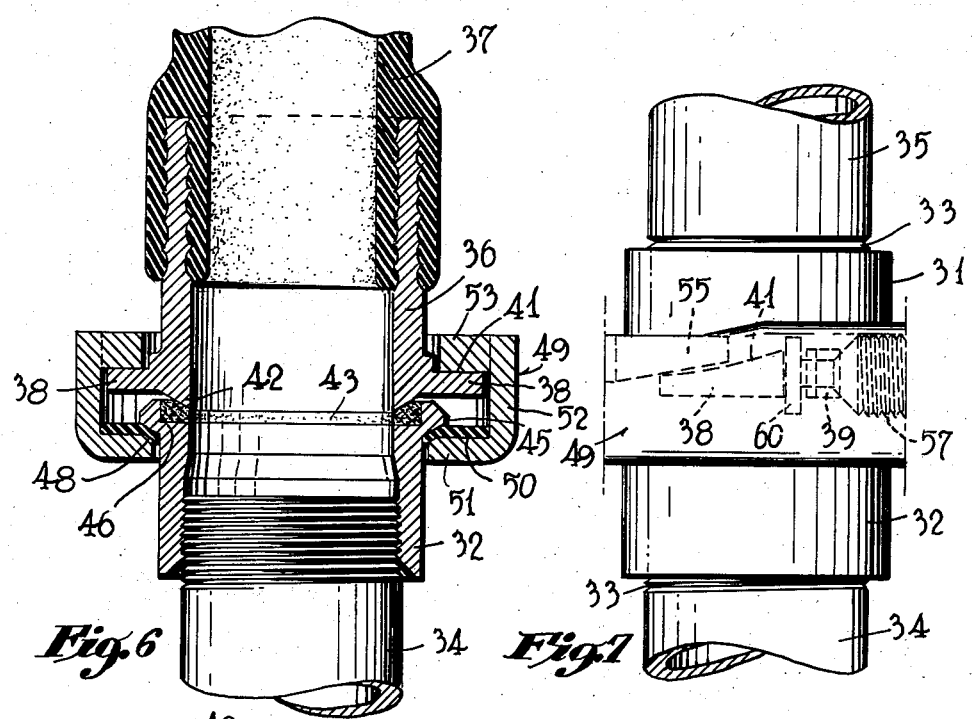
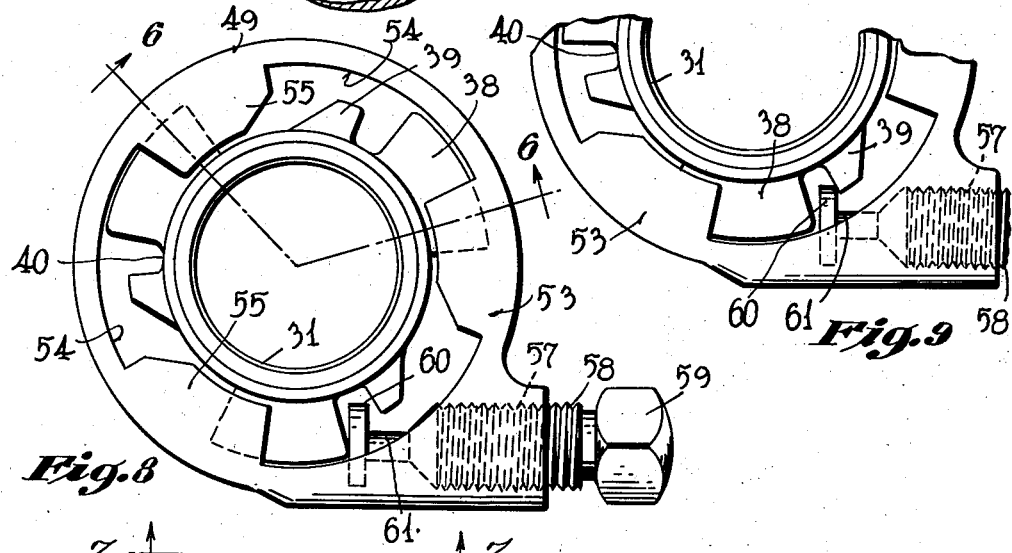
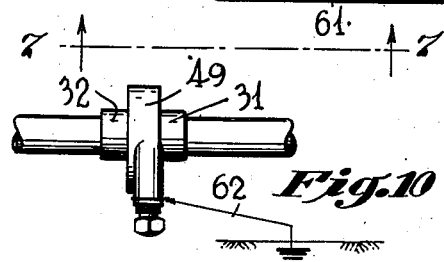
INVENTOR
Stephen V. Dillon
BY Barry + Cyr
ATTORNEYS May 26, 1942.   S. V. DILLON   2,283,974
COUPLING
Filed Dec. 6, 1940   6 Sheets-Sheet 3

INVENTOR
Stephen V. Dillon
BY Barry + Cyr
ATTORNEYS

May 26, 1942.  S. V. DILLON  2,283,974
COUPLING
Filed Dec. 6, 1940  6 Sheets-Sheet 4

INVENTOR
Stephen V. Dillon
BY Barry + Cyr
ATTORNEYS

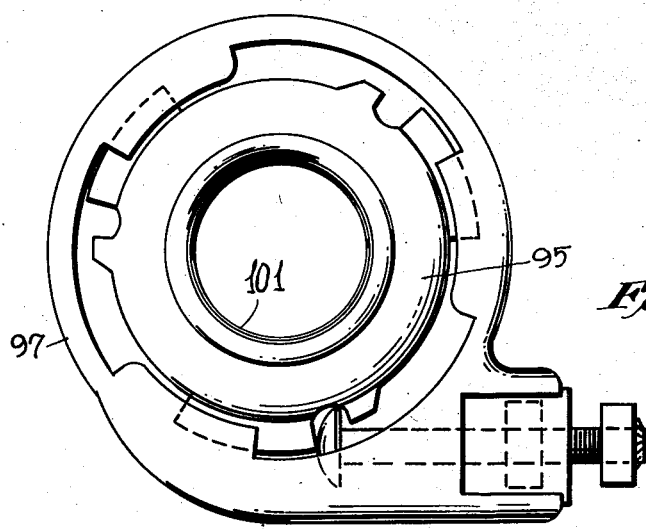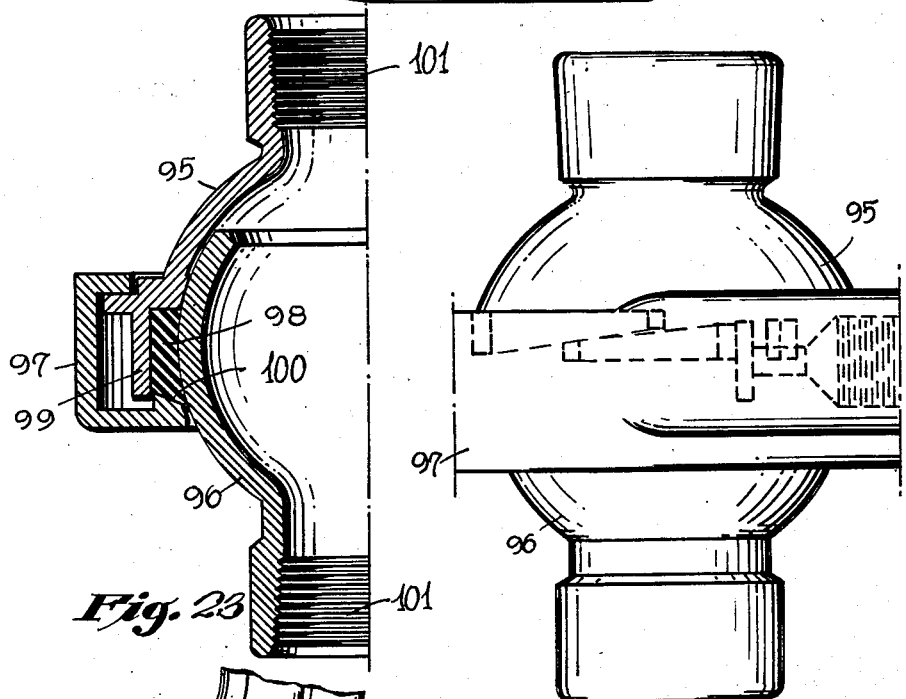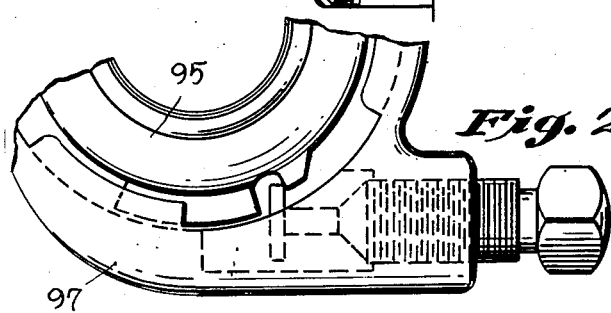

May 26, 1942.  S. V. DILLON  2,283,974
COUPLING
Filed Dec. 6, 1940  6 Sheets-Sheet 6
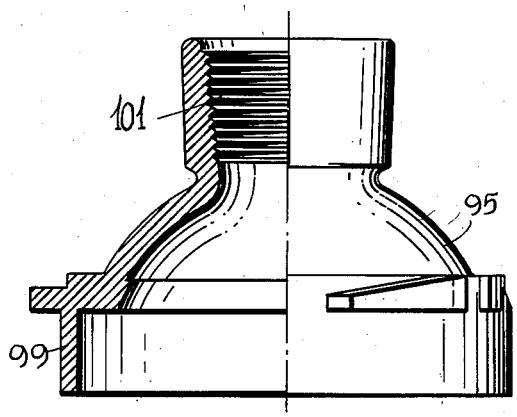
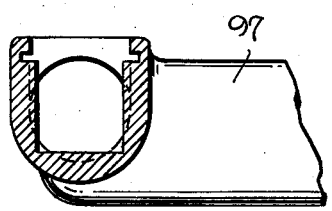
Fig. 27
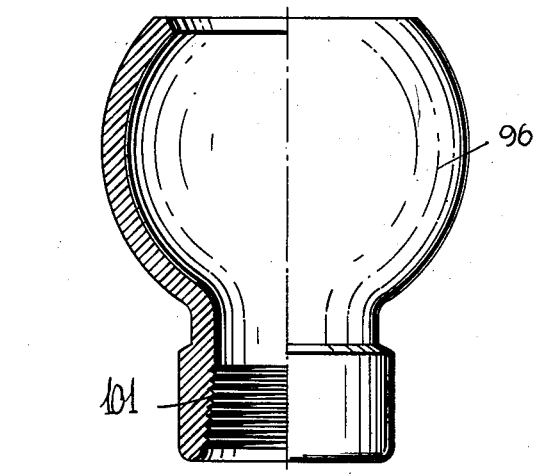
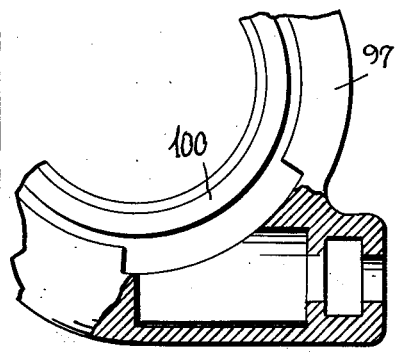
Fig. 28
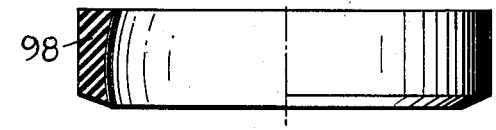
Fig. 26
Fig. 29
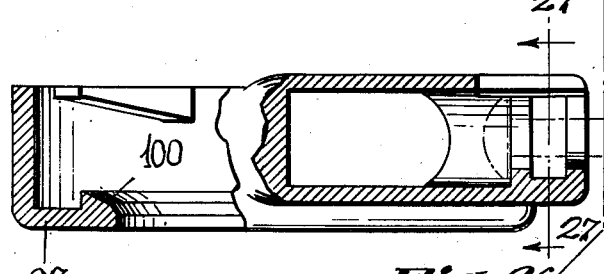
Fig. 30
INVENTOR
Stephen V. Dillon
BY Barry + Cyr
ATTORNEYS Patented May 26, 1942

2,283,974

UNITED STATES PATENT OFFICE 2,283,974

COUPLING

Stephen V. Dillon, Tulsa, Okla., assignor to Hanlon-Waters, Inc., Tulsa, Okla.

Application December 6, 1940, Serial No. 368,942

8 Claims. (Cl. 285—175)

This invention relates to improvements in couplings and more particularly to a novel pipe coupling.

Pipe couplings of the bayonet or wedge type employing screws or bolts for tightening or sealing purposes are well known and in use at the present time but so far as I am aware no practical means has been devised for loosening such joints. It is usually necessary in loosening or breaking the joint to strike the same with a hammer or other tool. This may not only result in the breaking of the metal when cold, or mutilation of the joint but may prove dangerous due to the production of sparks which obviously might ignite combustible vapors or gases in the vicinity of the joint.

The primary object of the present invention is to eliminate such objections and to provide a coupling of simple construction which may be readily tightened or loosened by novel threaded means operable by the use of a small tool to allow the joint to be readily installed or dismantled.

Another object is to supply a quick-detachable coupling which when installed, will seal against vacuum or any pressure conditions.

A further object is to furnish a coupling of the bayonet type adapted for use with prepared pipe ends or pipes prepared for welding.

Another object is to supply a coupling of the bayonet type which may be readily loosened or dismantled even though located in a position where a hammer or the like could not be effectively employed.

A further object is to provide a novel bayonet type joint which may be shaped to accommodate small or large angular deflections.

Another and important object is to supply a coupling of the bayonet type, the coupled parts of which may be formed of castings, forgings or the like.

Another object is to furnish a coupling of the bayonet type having operating means forming a permanent part of one of the members of the coupling to prevent loss of the operating means during shipment or when dismantled, etc.

With the foregoing objects outlined and other objects in view which will appear as the description proceeds, the invention consists in the novel features hereinafter described in detail, illustrated in the accompanying drawings, and more particularly pointed out in the appended claims.

In the drawings:

Fig. 1 is a developed side elevation of the elements of a form of the coupling in which internally threaded collars are employed.

Fig. 2 is a plan view of one of the collars.

Fig. 3 is a plan view of one half of a sealing ring employed between the collars.

Fig. 4 is a plan view of a half of the other one of the collars.

Fig. 5 is a plan view partly in horizontal section of the casing or housing member of the coupling illustrated in Fig. 1.

Fig. 6 is a vertical sectional view of a coupling of the general type illustrated in Fig. 1, and taken on line 6—6 of Fig. 8, but with a hose connection employed instead of one of the threaded collars.

Fig. 7 is an elevation of the coupling illustrated in Fig. 1 shown attached to a pair of pipes, and with the view taken on the line 7—7 of Fig. 8.

Fig. 8 is a plan view of the coupling illustrated in Fig. 1 with the elements of the coupling assembled and illustrating the action of the threaded operating means in tightening the joint.

Fig. 9 is a fragmentary view similar to Fig. 8 but showing the action of the operating means in loosening the joint.

Fig. 10 is a fragmentary view of a pipe line with one of the improved joints installed therein and illustrating the manner in which the same may be grounded where it is desired that destructive electric current be grounded.

Fig. 22 is a plan view of a coupling in accordance with my invention and showing the improvements applied to a joint of the ball and socket type.

Fig. 23 is a radial vertical sectional view of the ball and socket coupling.

Fig. 24 is an elevation of the same with opposite sides of the housing removed to facilitate illustration.

Fig. 25 is a fragmentary view similar to Fig. 22, but showing a different type of operating means.

Fig. 26 is a developed view partly in elevation and partly in vertical section of the elements which make up the ball and socket type coupling.

Fig. 27 is a vertical sectional view of a portion of the housing element of the ball and socket joint.

Fig. 28 is a fragmentary plan view partly in horizontal section of said housing.

Fig. 29 is a perspective view of the retainer for the operating means of the ball and socket coupling.

Fig. 30 is a side elevation of one form of operating means which may be employed in the ball and socket coupling.

Figure 11:
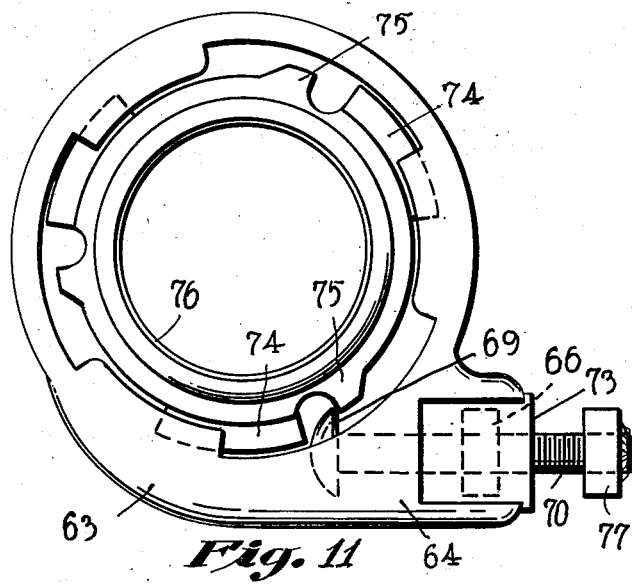
Fig. 11 is a plan view of a modification in which the operating means is in the form of a bolt and nut forming a permanent attachment of the housing of the joint.
Figure 12:
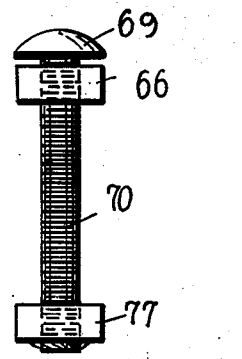
Fig. 12 is a side elevation of such bolt and nut.
Figure 14:
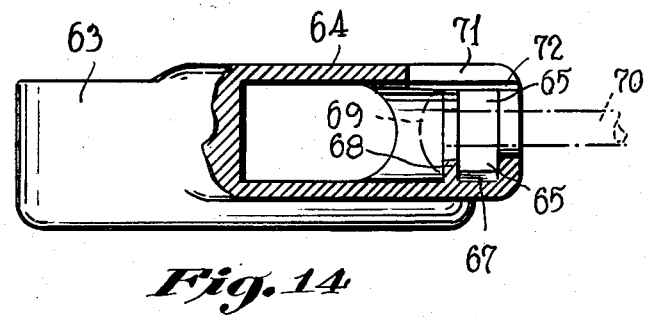
Fig. 14 is a side elevation of the housing shown in Fig. 11, partly in vertical section.
Figure 13:
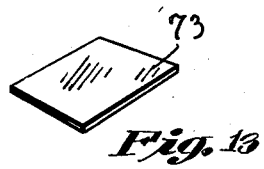
Fig. 13 is a perspective view of a sliding keeper employed in permanently attaching the operating means to the housing.
Figure 15:
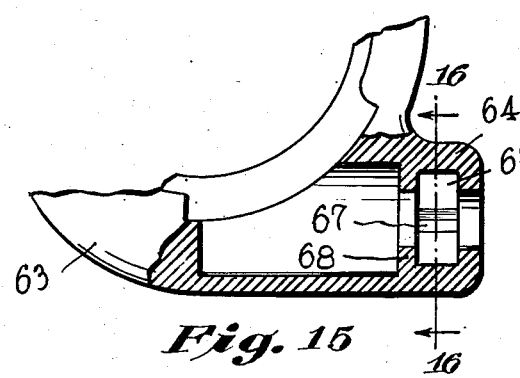
Fig. 15 is a fragmentary plan view of the housing partly in horizontal section.
Figure 16:
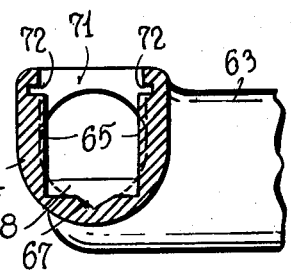
Fig. 16 is a vertical sectional view taken on line 16—16 of Fig. 15.

Referring to the drawings, and more particularly to Figs. 1 to 10 inclusive, 31 and 32 designate respectively the collar members of one form of the coupling. In this form, each collar may be provided with internal threads to engage the external threads 33 (Fig. 7) of the pipes 34 and 35 which are to be coupled. It is obvious that such collars could be shaped to accommodate welding, flanges or for other specially prepared pipe ends.

As shown in Fig. 6, the collar 31 may form part of a nipple 36 permanently connected to a hose 37 by vulcanization or the like. Such a structure is especially useful for coupling rotary hose employed in connection with well drilling. Manifestly the nipple 36 might be externally corrugated or plain for insertion in hose lines employed for various purposes.

The collar 31 is provided near one end with outwardly projecting tapered wings or wedge elements 38, and adjacent each element 38 is an outwardly projecting lug 39 spaced from the adjacent wing by a recess 40. It will be noted from Fig. 1 that each lug 39 is of greater height than the wing with which it is associated and that the upper surface of the wing inclines away from the adjacent lug as indicated at 41.

The lower surface of the collar 31 is preferably beveled as shown at 42 to engage an internal tapered surface of a sealing ring 43, accommodated in a recess or rabbet 44 in the upper end of the collar 32. The beveled surface 42 allows for angular deflection of the pipes.

An annular flange 45 at the upper end of the collar 32 has upper and lower beveled or rounded surfaces 46 and 47; the latter being shaped to engage a beveled or rounded surface 48 of the housing to permit angular deflection of the pipes which are connected to the collars.

As illustrated in Fig. 6, if the joint is to be insulated to prevent transmission of vibrations or electric current along the pipe line, a washer 50 of any suitable material may be positioned on the bottom 51 of the housing to be engaged by the lower surface of the flange 45 of collar 32.

The housing is of ring shape and of substantially recumbent U shape in radial section, having a circular wall 52 extending upwardly from its bottom and merging into an annular top 53; the latter being recessed as shown at 54 to accommodate the wings 38 and lugs 39 of the collar 31. The portions of the top between the recesses provide inwardly extending lugs 55 each of which has an inclined bottom surface 56 adapted to be contacted by the inclined surfaces of the wings 38 of the collar 31 so as to cause axial movement of the parts when the collar 31 is turned in a clockwise direction relatively to the housing. Such turning is caused by operating means which may be as follows. The housing has a substantially tangentially extending hollow arm 57, internally threaded to engage the threads 58 of a screw member that is provided at its external end with an angular head 59 which may be readily turned by a small wrench or the like. The inner end of the threaded member is provided with a disc 60 joined to the body of such member by a narrow neck 61; the disc being adapted to enter any one of the recesses 40 and to engage one end of any of the wings 38 or the adjacent end of the lug 39 for use in turning the collar 31. As shown in Fig. 8, the disc is in engagement with an end of one wing 38, and in this position if the threaded member is turned in a clockwise direction, it will move toward the left and force the collar to turn in a clockwise direction so that the inclined surfaces of the wings 38 and lugs 53 will effect tightening of the joint. On the other hand, if the threaded member is turned counter-clockwise (Fig. 9), the disc will engage the lug 39 and thus turn the collar 31 counter-clockwise so as to loosen the joint. Obviously this simple threaded means makes it unnecessary to employ a hammer or the like in loosening or dismantling the joint.

If the coupling is used for insulating purposes against electric currents and the washer 50 is employed, any suitable means may be used in grounding the joint; for example, as illustrated in Fig. 10, an electricity conductor 62 may have one of its ends secured to the housing and the other connected to ground.

To simplify the construction and reduce machining of the castings, I may employ the constructions shown in Figs. 11 to 21 inclusive, or in Figs. 26 to 30 inclusive. Referring to Figs. 11 to 16, the housing 63 is provided with a hollow arm 64 which is unthreaded. However, the bore of the arm has a portion provided with parallel opposed surfaces 65 to contact with opposed surfaces of a nut 66. If the nut is of hexagonal shape, one of its points may be accommodated by a groove 67 arranged in the bore. Immediately inward of the surfaces 65 there is a barrier or short wall 68 which will act as a stop for the head 69 of a threaded bolt 70 employed in this construction. To facilitate insertion or removal of the bolt the outer end portion of the bore is open as indicated at 71 and the opposite sides of the open portion are provided with grooves 72 to receive opposite side edges of a cover or retainer 73. When the cover is removed, it is obvious (Fig. 14) that the head end of the bolt and the nut 66 may be inserted in the bore. Then the cover may be added to hold the bolt and nut in place. Now the bolt may be tightened so as to feed the head 69 inwardly to a point where it is in position to engage a wing 74 or lug 75 of the collar 76. To facilitate turning of the bolt, a nut 77 may be secured to its outer end in any suitable way, such as peening or welding. It is also evident that the cover 73 can be secured in place in any approved fashion. For instance, this could be accomplished by making the grooves 72 of wedge shape so as to increase the frictional engagement as the cover is driven into closed position.

Figure 17:
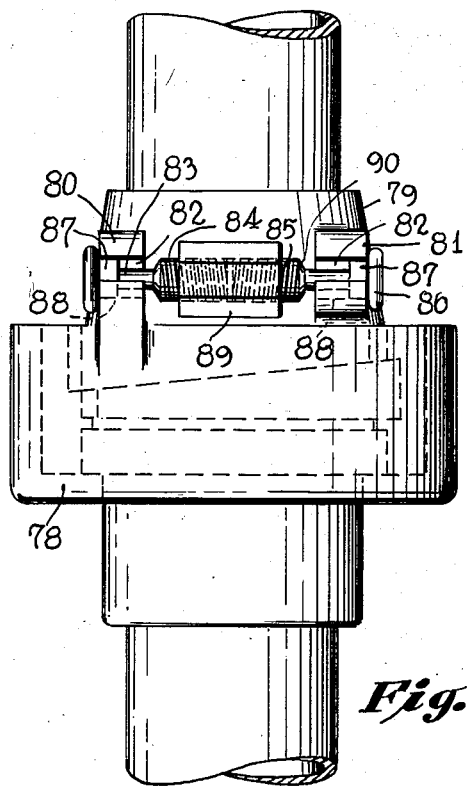
Fig. 17 is an elevation of a portion of a pipe line provided with another embodiment of my invention in which a pair of opposed thread screws form part of the operating means.
Figure 18:
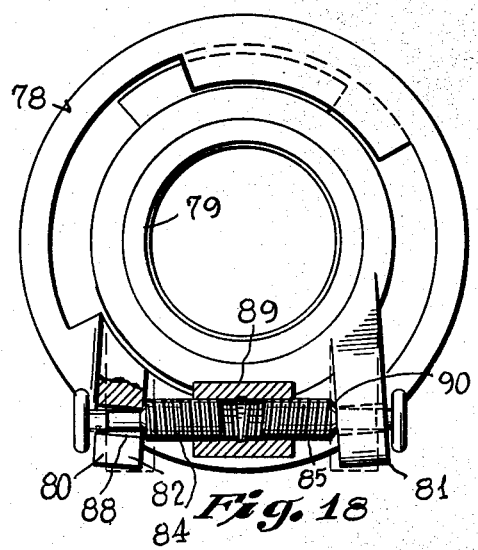
Fig. 18 is a plan view partly in horizontal section of the coupling shown in Fig. 17.
Figure 20:
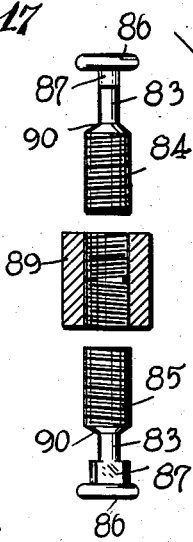
Fig. 20 is an elevation partly in longitudinal section of the operating means used in the coupling illustrated in Figs. 17 and 18.

In the modification shown in Figs. 17, 18 and 20, the housing 78, and collar 79 may be provided with companion arms 80 and 81, each having a notch 82 to facilitate the introduction of the neck portion 83 of a threaded member 84, 85. Each of these members is provided at its outer end with a head 86 and an adjacent flatsided portion 87, the latter being adapted to operate in a vertical groove 88 in the arm to prevent turning of the threaded member relatively to the arm. The threaded members have opposed pitched threads to co-act with the internal oppositely pitched threads of a nut 89. When the nut is turned in one direction, the ends 86 will engage the outer sides of the arms and pull the arms toward one another so as to cause the wedges of the collar to travel along the inclined surfaces of the lugs of the housing. On the other hand, if the nut is turned in the opposite direction, annular shoulders 90 on the threaded members will abut against the inner surfaces of the arms and thus move the collar in a counter-clockwise direction and thus loosen the joint.

Figure 21:
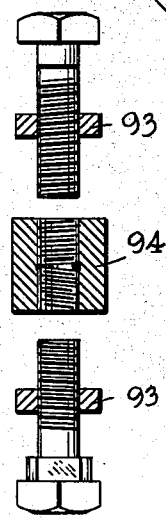
Fig. 21 is a view similar to Fig. 20 but illustrating the operating means for the coupling of Fig. 19.
Figure 19:
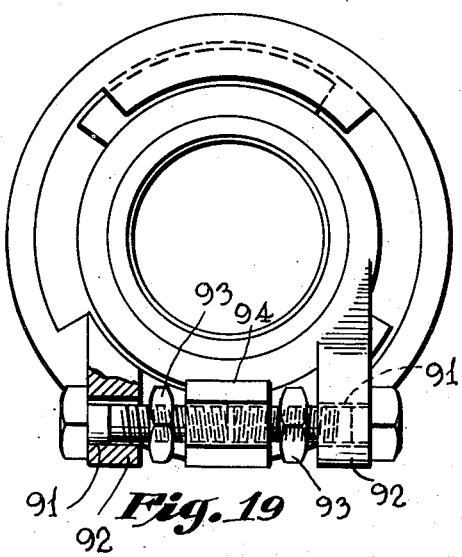
Fig. 19 is a view similar to Fig. 18 but showing a modification in which oppositely threaded bolts are employed in lieu of the threaded members shown in Fig. 18.

Instead of employing specially shaped threaded members, I may employ oppositely threaded bolts for the purpose, as illustrated in Figs. 19 and 21. In this instance, each bolt will extend through an unthreaded aperture 91 in the arm 92 and each bolt will have a nut 93 secured intermediate the ends thereof. The nut will act as an abutment whereby when the master nut 94 is turned, it will cause the abutment nuts to engage the arms and loosen the coupling.

In the structures shown in Figs. 22 to 30 inclusive, one of the collars forms a socket 95 to receive the ball 96 of the other collar, and the housing 97 forms a receptacle for a packing ring or gasket 98. The latter engages the external surface of the ball and is retained in position by a skirt 99 of the socket collar and a short annular wall 100 of the housing. It will be evident that the operating means may be similar to the ones already described. For example, in Figs. 22 and 26 to 30 inclusive, I show the operating means described in connection with Figs. 11 to 16 inclusive, while in Figs. 24 and 25 I have shown the operating means illustrated in Figs. 1 to 9 inclusive.

Instead of providing the collar members of the ball and socket joint with internal threads 101, it is evident that they may be shaped for attachment by welding, flanges or the like, or as illustrated in Fig. 6 to accommodate either a permanent or slip-on hose joint.

Instead of using the sealing means illustrated, it is obvious that ground joints, forged steel rings, U-shape gaskets, or the like may be employed. Any suitable means for sealing purposes can be used with my coupling.

While I have disclosed what I now consider to be preferred embodiments of the invention in such manner that the same may be readily understood by those familiar with this subject, I am aware that changes may be made in the details without departing from the spirit of the invention as expressed in the claims.

What I claim and desire to secure by Letters Patent is:

1. In a bayonet joint of the type employing tapered elements for wedging coupling members into sealing position, the improvement comprising threaded operating means operatively connected to a first member of the coupling and engaging a second member of the coupling for turning one member in opposite directions relatively to the other member to either tighten or loosen the joint.

2. In a bayonet joint of the type employing tapered elements for wedging coupling collars into sealing position, the improvement comprising a housing provided with internal threads, an elongated member arranged substantially tangentially relatively to the housing and having external threads engaging the threads of the housing, and means detachably connecting the inner end of the elongated member to one collar for turning the latter in opposite directions relatively to said housing to either tighten or loosen the joint.

3. In a coupling of the character described, an annular female housing member of substantially channel shape in radial section and having a bottom, top and annular wall, the top being provided with spaced recesses and the portion of the top between said recesses forming inwardly extending lugs provided with inclined bottom surfaces, an arm projecting substantially tangentially from said wall and provided with a bore leading from the exterior to the interior of the housing, internal threads forming part of the bore, an operating member having external threads engaging the threads in the bore, a male member having outwardly extending spaced wings adapted to pass through the recesses of the housing member and into the latter, said wings having top inclined surfaces engageable with the inclined surfaces of the lugs of the housing for causing wedging of one member relatively to the other when the male member is turned in one direction relatively to the female member, second lugs extending outwardly from the male member and positioned between the wings, said operating member having a head at its inner end engageable with either a wing or second lug of the male member for turning the latter in opposite directions, depending on the direction of turning of the operating member, for tightening or breaking the joint.

4. In a coupling, an annular housing member provided with spaced inclined surfaces and having an internal annular groove, a collar extending through one end of the housing and having outwardly projecting wings provided with inclined surfaces engaging the inclined surfaces of the housing member, means at the adjacent ends of the collars providing a seal between the collars, threads supported by the housing member, and a threaded member engaging the threads of the housing and detachably connected to the second collar for turning the latter in opposite directions relatively to the housing member for tightening or loosening the joint, said detachable connection being formed partially by a head on the threaded member and a lug projecting outwardly from the second collar.

5. In a coupling, an annular housing member provided with a bottom, top and annular wall, said top being provided with spaced recesses and having inclined bottom surfaces arranged between the recesses, a hollow arm projecting from and arranged substantially tangentially relatively to the housing, a threaded bolt extending through the arm and having a head at the inner end thereof, a nut mounted in the hollow arm and having threaded engagement with the bolt, means at the outer end of the bolt to facilitate turning the latter, a collar having outwardly projecting wings adapted to pass through said recesses and having inclined top surfaces adapted to slidably engage the inclined surfaces of the top of the housing, each of said wings being adapted to engage the head of the bolt whereby the bolt will cooperate with the collar for turning the collar in one direction, and lugs projecting outwardly from the collar adjacent to certain ends of the wings and adapted to be engaged by the head of the bolt for turning the collar in the opposite direction.

6. In a coupling of the character described, an annular housing having a top, bottom and annular wall, said top being provided with spaced recesses and having inclined surfaces at its bottom arranged between said recesses, a collar having outwardly extending wings adapted to pass through said recesses and having inclined top surfaces engageable with the inclined surfaces of the top of the housing, opposed arms projecting from the housing and collar, and means including oppositely pitched threads for moving said arms toward or away from one another for tightening or loosening the coupling.

7. In a coupling of the character described, an annular housing having a top, bottom and annular wall, said top being provided with spaced recesses and having inclined surfaces at its bottom arranged between said recesses, a collar having outwardly extending wings adapted to pass through said recesses and having inclined top surfaces engageable with the inclined surfaces of the top of the housing, opposed arms projecting from the housing and collar, and means including oppositely pitched threads for moving said arms toward or away from one another for tightening or loosening the coupling, the last-mentioned means comprising a nut having oppositely pitched threads.

8. In a coupling of the character described, an annular housing having a top, bottom and annular wall, said top being provided with spaced recesses and having inclined surfaces at its bottom arranged between said recesses, a collar having outwardly extending wings adapted to pass through said recesses and having inclined top surfaces engageable with the inclined surfaces of the top of the housing, opposed arms projecting from the housing and collar, and means including oppositely pitched threads for moving said arms toward or away from one another for tightening or loosening the coupling, the last-mentioned means comprising stationary threaded elements having oppositely pitched threads, and a nut with oppositely pitched threads engaging the threads of the threaded elements.

STEPHEN V. DILLON.